United States Patent [19]
Jang et al.

[11] Patent Number: 6,089,562
[45] Date of Patent: Jul. 18, 2000

[54] DEVICE FOR FEEDING A RECORDABLE PAPER TO AN IMAGE FORMING APPARATUS

[75] Inventors: Heung-kyu Jang, Kyonggi-do; Seung-taik Hwang, Seoul, both of Rep. of Korea

[73] Assignee: SamSung Electronics Co., Ltd., Suwon, Rep. of Korea

[21] Appl. No.: 09/216,728

[22] Filed: Dec. 21, 1998

[30]     Foreign Application Priority Data

Dec. 19, 1997 [KR]   Rep. of Korea ....................... 97-70910

[51] Int. Cl.[7] ...................................................... B65H 5/00
[52] U.S. Cl. ................................. 271/10.11; 271/10.16; 271/117; 271/126; 271/128
[58] Field of Search ............................. 270/10.09, 10.11, 270/10.14, 10.16, 117, 118, 126, 127, 128

[56]             References Cited

U.S. PATENT DOCUMENTS 4,896,871  1/1990  Idenawa .
4,991,830  2/1991  Yamanaka ............................. 271/117 X
5,358,230  10/1994  Ikemori et al. ....................... 271/118 X

*Primary Examiner*—David H. Bollinger
*Attorney, Agent, or Firm*—Robert E. Bushnell, Esq.

[57]             ABSTRACT

Disclosed is a device for feeding a recordable paper to an image forming apparatus. The device according to the present invention is designed such that a document feeder is disposed on a knock-up plate on which recordable papers are stacked so as to feed a document using such a identical path of feeding the recordable paper when printing as that of feeding a document to be scanned. When scanning the document, the document feeder is positioned over the knock-up plate having the recordable papers stacked thereon to be adjacent to the feed roller. Accordingly, there is an advantage in that a structure of the image forming apparatus is simply, resulting in providing a convenience for an user.

11 Claims, 7 Drawing Sheets

DEVICE FOR FEEDING A RECORDABLE PAPER TO AN IMAGE FORMING APPARATUS

CLAIM OF PRIORITY

This application makes reference to, incorporates the same herein, and claims all benefits accruing under 35 U.S.C. §119 from applications for A DEVICE FOR FEEDING A RECORDABLE PAPER TO AN IMAGE FORMING APPARATUS earlier filed in the Korean Industrial Property Office on Dec. 19, 1997, and there duly assigned Ser. No. 97-70910.

BACKGROUND OF THE INVENTION

1. Field of the Invention

The present invention relates to sheet feeding devices, and more particularly to a device for feeding recordable papers to an image forming apparatus.

2. Description of the Related Art

Generally, an image forming apparatus has a structure such that in a case of printing, a recordable paper is automatically fed thereto so that the printing is continuously performed and in a case of scanning, a document to be scanned is manually fed through a separate path different from that of feeding the recordable paper so that the scanning is performed.

An exemplary earlier image forming apparatus has a port for feeding the recordable paper formed on a side of a body of the apparatus, in which a main frame is mounted. A knock-up plate, on which the recordable papers are stacked, is mounted and supported by a knock-up spring on the main frame. A pick-up roller is disposed on an upper surface of an end portion of the knock-up plate to move the recordable paper toward a feed roller. On the other hand, a port for feeding a document to be scanned is formed below the main frame so that the document is fed.

A plurality of idle rollers are mounted on a rotating shaft having a pick-up roller mounted thereon to guide the recordable paper. A pick-up cam is disposed at an end of the rotating shaft to shift the knock-up plate as the pick-up roller is rotated.

An end of the pick-up cam functions as a pressure bar contacting with the projection formed at a side of the knock-up plate and the other end of the pick-up cam functions as a support contacting with the pressure lever of the finger lever. The finger lever is positioned at a side of the main frame to feed the recordable paper. The finger lever includes an arm which extends horizontally from the hinge axis and has a finger at an end thereof, and a pressure lever which extends vertically from the hinge axis and is in contact with the support of the pick-up cam at an end thereof.

A finger spring is disposed between the main frame and the arm. The arm is supported by the finger spring on the main frame.

An operation of the device for feeding the recordable paper to the image forming apparatus according to the conventional art will be described. In the standby state, the knock-up plate is positioned by the pick-up cam at a bottom of the main frame. In the state, a knock-up spring is compressed.

As the pick-up roller rotates clockwise, the pick-up cam rotates together with the pick-up roller. Thus, the projection of the knock-up plate, which is restrained by the pressure bar, is released from the restrained state. The knock-up plate is shifted upward by means of a resilient force of the knock-up spring in the main frame.

At the same time, the pressure lever of the finger lever, which is restrained by the support of the pick-up cam, is also released from the restrained state so that the finger lever is counterclockwise rotated by means of the resilient force of the finger spring. Therefore, the recordable paper is in close contact with the pick-up roller by means of the knock-up plate shifted upward while being fed by means of the finger one by one as the finger lever rotates counterclockwise.

In this earlier device for feeding the recordable paper to the image forming apparatus, however, since the port for feeding a document to be scanned is separated from the port for feeding the recordable paper, there is a disadvantage in that the body must be moved in a direction for performing a feed of the document to be scanned every when scanning. Furthermore, as the path for feeding the recordable paper is different from the path for feeding the document, there is another disadvantage in that since an AC adapter is required for feeding the document, a structure of the image forming apparatus is complex. When the mode is converted from a recordable paper feeding mode to a document feeding mode or from the document feeding mode to the recordable paper feeding mode, the recordable paper stacked on the knock-up plate is substituted for the document to be scanned, or the document is substituted for the recordable paper.

Another example of a sheet feeder of the contemporary art is seen in U.S. Pat. No. 4,896,871, to Idenawa, entitled Sheet Feeder For An Image Recording Apparatus. This patent describes a sheet feeder for a laser printer which can be operated in manual or automatic sheet feeding mode, and which does not require a release lever for manual feeding.

Based on my observation of the art, then, I have found that what is needed is an apparatus min which the document to be scanned can be fed along the same path as the recordable paper.

SUMMARY OF THE INVENTION

It is therefore an object of the present invention to provide an improved device for feeding a recordable sheet of paper to an image forming apparatus.

It is another object of the present invention to provide a device for feeding recordable paper to an image forming apparatus which is of simple structure.

It is still another object of the present invention to provide a feeding apparatus which is convenient for the user.

It is yet another object of the present invention to provide an apparatus in which the document to be scanned is fed along a path of feeding recordable paper.

It is a further object of the present invention to provide a device for feeding recordable paper to an image forming apparatus in which it is not necessary to change recordable paper stacked thereon into another paper when switching modes.

The present invention has been made to overcome the above described problems of the prior art. To accomplish the above objects of the present invention, there is provided a device for feeding a recordable paper to an image forming apparatus, having: a main frame mounted in a port for feeding the recordable paper, the port being formed on a side wall of a body; a pick-up roller which is disposed on an upper portion of an inner end of the main frame, for moving the recordable paper to a printing position; a feeding roller which is mounted in the body to be spaced from the pick-up roller, for transferring a document to be scanned to a scanning position; a knock-up plate which is mounted on an upper surface of the main frame to be resiliently moved by a knock-up spring, for closely contacting the recordable paper with the pick-up roller when the recordable paper is fed, the recordable papers being stacked on the knock-up plate; a feeder which is pivoted on a hinge axis of the main frame to be disposed over the knock-up plate, for feeding the document, a leading edge of the document feeder being spaced from the knock-up plate during a feeding of the recordable papers and being positioned below the pick-up roller in contact with the knock-up plate during a feeding of the document; a pick-up cam which is mounted at an end portion on a rotating shaft having the pick-up roller mounted thereon, for making the pick-up roller to be spaced from the knock-up plate before the feeding of the recordable papers and for making the pick-up roller to be in close contact with the recordable paper so that the recordable paper is fed as the knock-up plate is forced by a knock spring; and a finger lever which is pivotally connected to a side of the main frame and has a finger for feeding a recordable paper by a sheet.

The knock-up plate includes a projection at a side thereof to restrain a position of the knock-up plate when the pick-up cam rotates. The pick-up cam has a pressure lever at an end thereof and a support for preventing a reverse rotation of the finger lever at another end thereof. A finger restraining boss for restraining the finger lever is formed at a side of the document feeder so that the document to be scanned is fed to the feed roller.

The finger lever includes an arm having a finger at an end thereof and a rotating lever which is restrained by the finger restraining boss of the document feeder to rotate the finger lever, the arm and the rotating lever being coaxially pivoted on a hinge shaft formed at the side of the main frame and an end of the arm being resiliently supported by a finger spring fixed to the main frame.

The pressure lever is rotatably mounted on the hinge shaft of the finger lever so as to restrain the support of the pick-up cam, which holds the knock-up plate under a pressure, while a resilient member is mounted on the hinge shaft and resiliently supports the finger lever and the pressure lever so that the finger lever and the pressure lever are moved together. The resilient member is a torsion spring.

BRIEF DESCRIPTION OF THE DRAWINGS

The above objects and other advantages of the present invention will become more apparent by describing in detail the preferred embodiment thereof with reference to the attached drawings, in which.

DETAILED DESCRIPTION OF THE DRAWINGS

Figure 1:
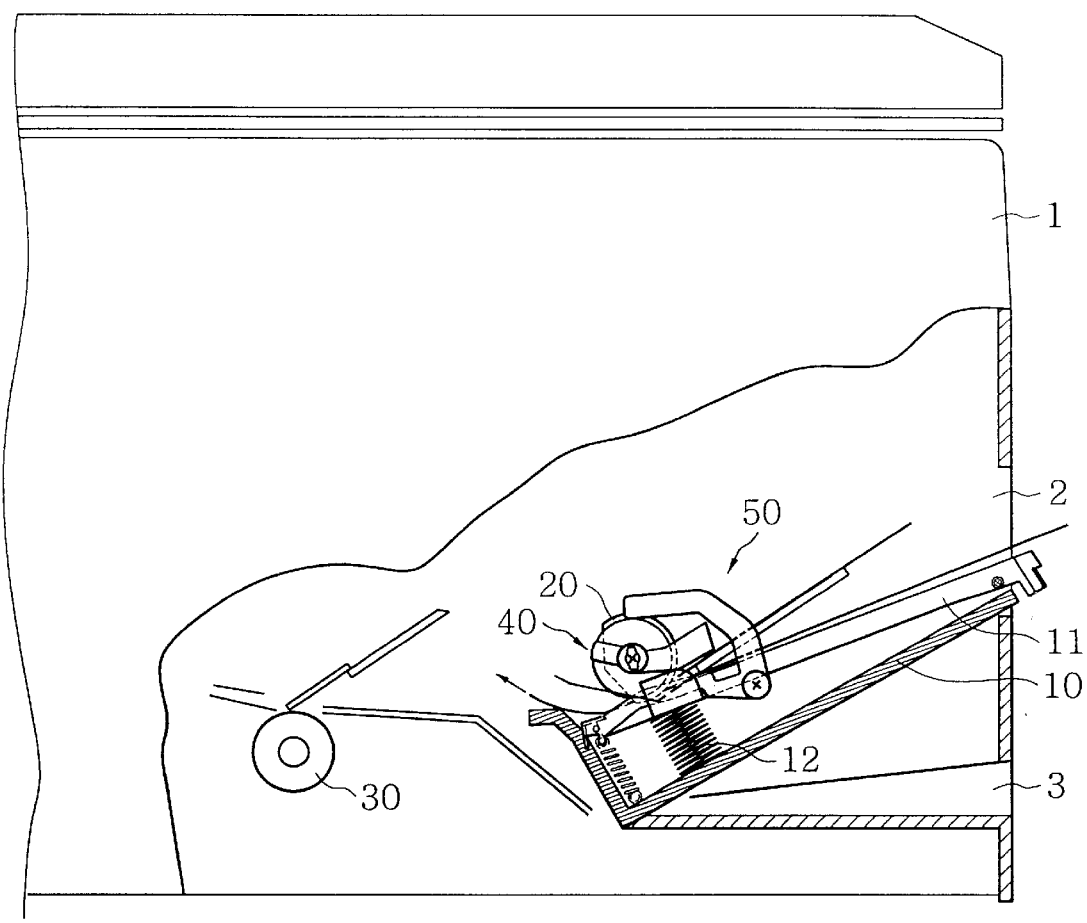
FIG. 1 is a partially sectional view of an image forming apparatus according to the conventional art, in which shows a device for feeding recordable paper.

Turning to the drawings, the structure of the exemplary image forming apparatus described above will be described with reference to FIG. 1. A port 2 for feeding the recordable paper is formed on a side of a body 1, in which a main frame 10 is mounted. A knock-up plate 11, on which the recordable papers are stacked, is mounted and supported by a knock-up spring 12 on the main frame 10. A pick-up roller 20 is disposed on an upper surface of an end portion of the knock-up plate 11 to move the recordable paper toward a feed roller 30. On the other hand, a port 3 for feeding a document to be scanned is formed below the main frame 10 so that the document is fed.

Figure 2:
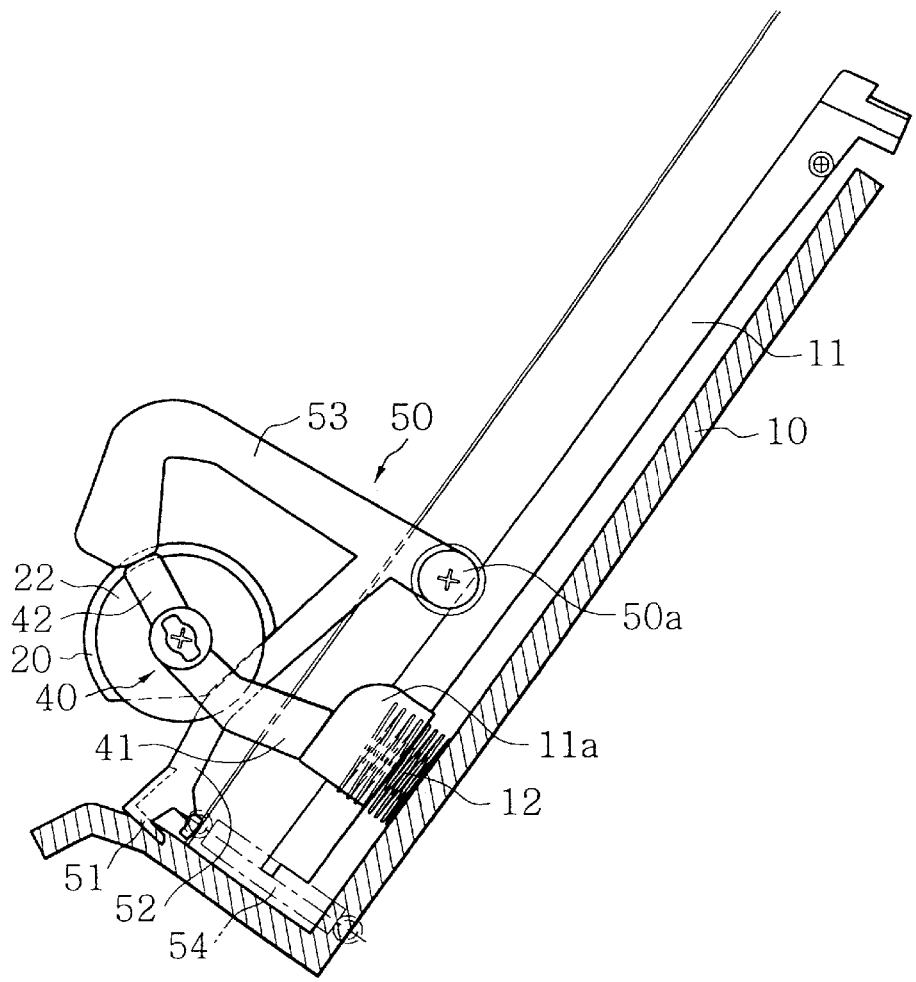
FIG. 2 is a view of a device for feeding recordable paper to an image forming apparatus according to the conventional art, in which shows the device in a standby state.
Figure 3:
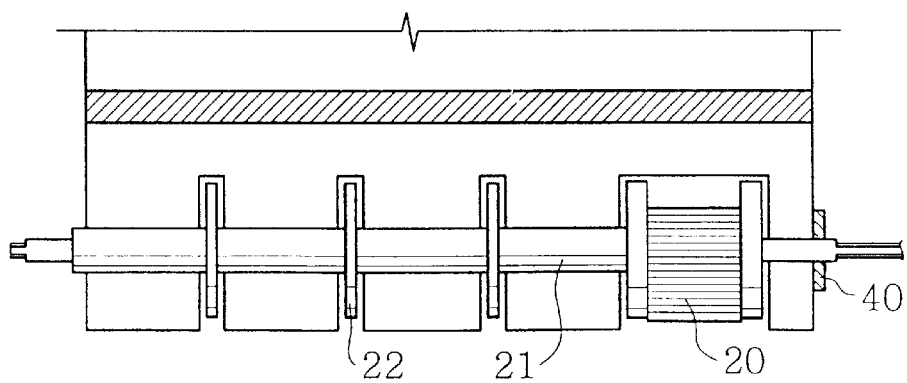
FIG. 3 is a back side view of a main frame of the device for feeding recordable paper to the image forming apparatus in FIG. 2.

As shown in FIGS. 2 and 3, a plurality of idle rollers 22 are mounted on a rotating shaft 21 having a pick-up roller 20 mounted thereon to guide the recordable paper. A pick-up cam 40 is disposed at an end of the rotating shaft 21 to shift the knock-up plate 11 as the pick-up roller 20 is rotated.

An end of the pick-up cam 40 functions as a pressure bar 41 contacting with the projection 11a formed at a side of the knock-up plate 11 and the other end of the pick-up cam 40 functions as a support 42 contacting with the pressure lever of the finger lever. The finger lever 50 is positioned at a side of the main frame 10 to feed the recordable paper. The finger lever 50 includes an arm 52 which extends horizontally from the hinge axis 50a and has a finger 51 at an end thereof, and a pressure lever 53 which extends vertically from the hinge axis 50a and is in contact with the support 42 of the pick-up cam at an end thereof A finger spring 54 is disposed between the main frame 10 and the arm 51. The arm 51 is supported by the finger spring 54 on the main frame 10.

The operation of the examplary device for feeding the recordable paper to the image forming apparatus according to the conventional art will be described. FIG. 2 is a sectional view of the device for feeding the recordable paper to the image forming apparatus according to the conventional art, in which the device is in a standby state. Referring to FIG. 2, the knock-up plate 11 is positioned by the pick-up cam 40 at a bottom of the main frame 10. In the state, a knock-up spring 12 is compressed.

Figure 4:
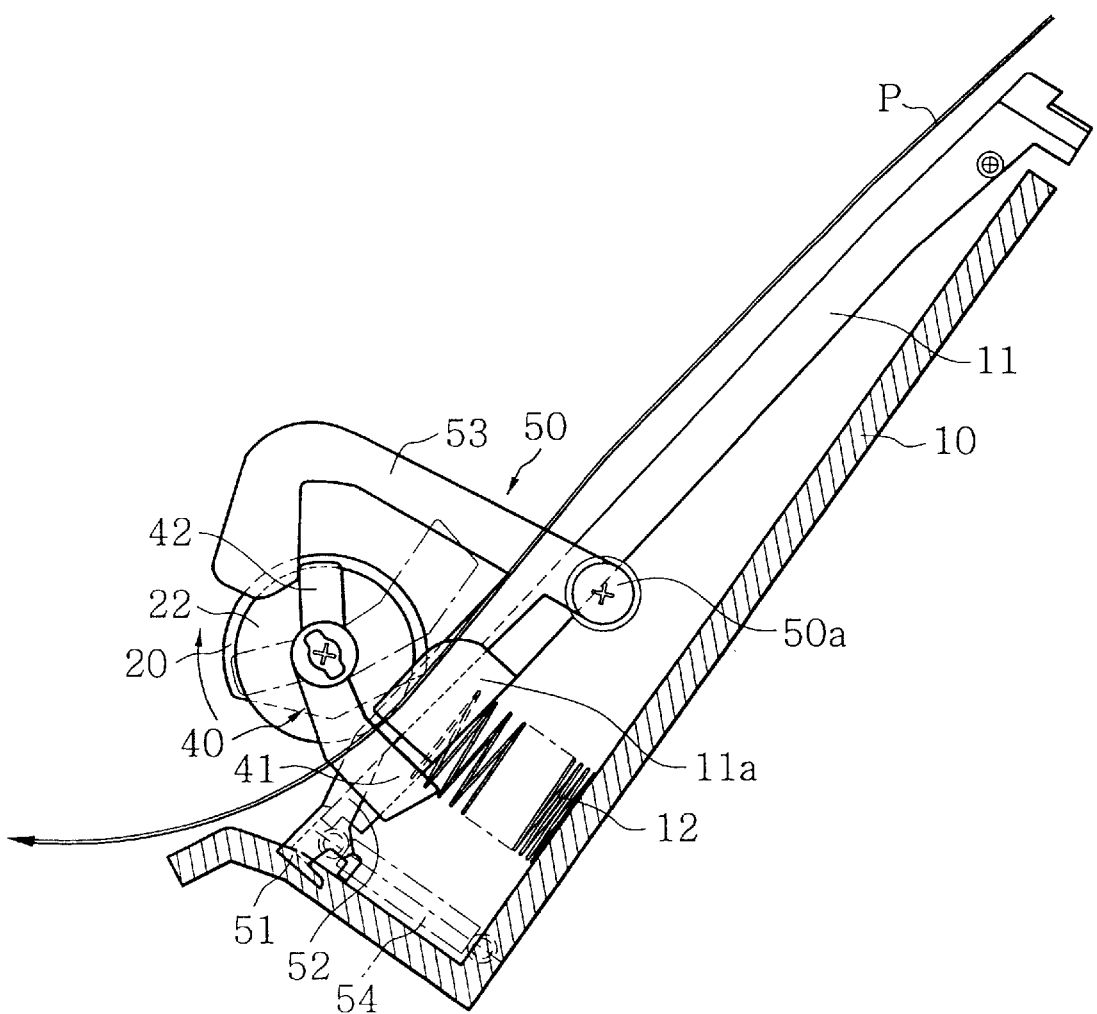
FIG. 4 is a sectional view of the device for feeding recordable paper to the image forming apparatus according to the conventional art, in which shows the recordable paper fed to the image forming apparatus.

FIG. 4 is a sectional view of the device for feeding the recordable paper to the image forming apparatus according to the conventional art, in which the knock-up plate 11 is shifted by the knock-up spring. Referring to FIG. 4, as the pick-up roller 20 rotates clockwise, the pick-up cam 40 rotates together with the pick-up roller 20. Thus, the projection 1 la of the knock-up plate 11, which is restrained by the pressure bar 41, is released from the restrained state. The knock-up plate 11 is shifted upward by means of a resilient force of the knock-up spring 12 in the main frame 11.

At the same time, the pressure lever 53 of the finger lever, which is restrained by the support 42 of the pick-up cam, is also released from the restrained state so that the finger lever 50 is counterclockwise rotated by means of the resilient force of the finger spring 54. Therefore, the recordable paper is in close contact with the pick-up roller 20 by means of the knock-up plate 11 shifted upward while being fed by means of the finger 51 one by one as the finger lever 50 rotates counterclockwise.

In the device for feeding the recordable paper to the image forming apparatus according to the conventional art, however, since the port 3 for feeding a document to be scanned is separated from the port 2 for feeding the recordable paper, there is a disadvantage in that the body 1 must be moved in a direction for performing a feed of the document to be scanned every when scanning.

Figure 5:
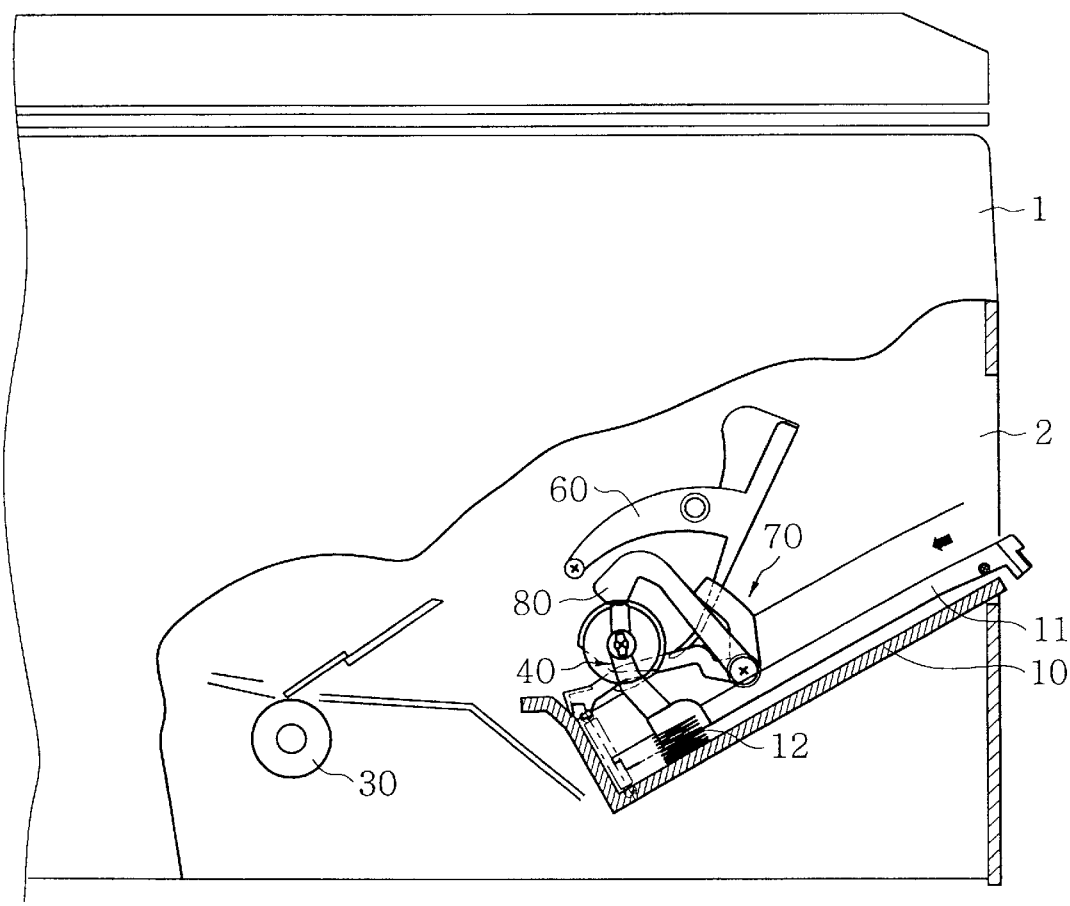
FIG. 5 is a partially sectional view of an image forming apparatus according to the present invention, in which shows a device for feeding recordable paper to the image forming apparatus.

Hereinafter, a device for feeding recordable paper to an image forming apparatus according to an embodiment of the present invention will be described in detail with reference to FIGS. 5 to 8. As shown in FIG. 5, a main frame 10 is installed in a port 2 for feeding recordable paper at a side of a body 1, on which a knock-up plate 11 is mounted to be supported by a knock-up spring 12 such that recordable papers are stacked on the knock-up plate 11. A pick-up roller 30 is disposed on an end portion of the knock-up plate 11 to feed the recordable paper to a feed roller 30.

In the present invention, the image forming apparatus is designed such that a feeder 60 for feeding a document is mounted over the knock-up plate 11 to feed the document to be scanned along a path of feeding the recordable paper. The feeder 60 for feeding the document is pivoted on a hinge axis 61 of the main frame 10. The feeder 60 has a leading edge spaced apart from the knock-up plate 11 when the recordable paper is fed. The leading edge of the feeder 60 is positioned below the pick-up roller 20 while being in contact with an upper surface of the knock-up plate 11 so that the document to be scanned is inserted between the feed rollers 30, when the document to be scanned is fed.

Figure 6:
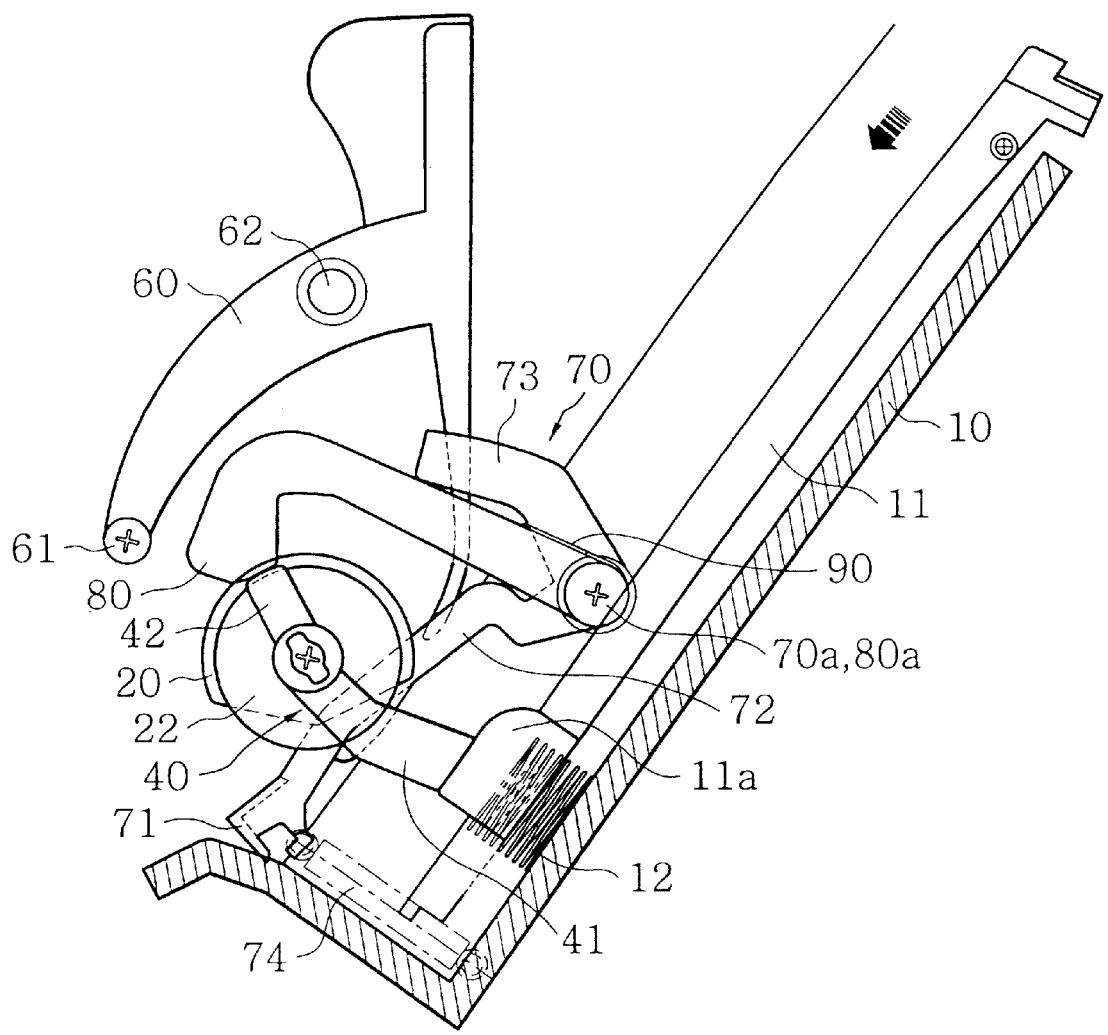
FIG. 6 is a sectional view of the device for feeding the recordable paper to the image forming apparatus according to the present invention, which is in a standby state.

As shown in FIG. 6, further, the pick-up roller 20 is mounted on a rotating shaft 21 which has a pick-up cam 40. The pick-up cam 40 includes a pressure bar 41 contacting with a projection 11a formed at a side of the knock-up plate 11 at an end thereof and a support 42 contacting with a pressure lever 80 of a finger lever 70 as described below at the other end thereof.

As the finger lever 70 is mounted at a side of the main frame 10, the finger lever 70 is formed such that an arm 72 having a finger 71 for feeding the recordable paper is integrated with a rotating lever 73 for rotating the finger lever 70 which is restrained by a rotation of the feeder 60. The pressure lever 80 restrained by the support 42 of the pick-up cam is formed separately from the finger lever 70, which is rotatably mounted at a hinge axis 80a concentric with a hinge axis 70a of the finger lever 70. A torsion spring 90 is mounted at the hinge axises 70a and 80a in such a manner that the torsion spring 90 is disposed between the finger lever 70 and the pressure lever 80, resulting in that the finger lever 70 is moved together with the pressure lever 80. The finger lever 70 is supported by the finger spring 74 on the main frame 10. Furthermore, a boss 62 for restraining the finger is projected from a side of the feeder 60 to restrain the rotating lever 73 of the finger lever 70 when the feeder 60 is rotated.

A like numeral is used for the same part as that of the conventional art. Hereinafter, an operation of the device for feeding the recordable paper to the image forming apparatus according to the present invention will be described. FIG. 6 is a sectional view of the device for feeding the recordable paper to the image forming apparatus according to the present invention, in which the device is in a standby state. As the projection 1a of the knock-up plate 11 is pressed by the arm 41 of the pick-up cam 40, the knock-up plate 11 is positioned at a bottom of the main frame 10 with pressing the knock-up spring 12.

In addition, since the pressure lever 80 is supported by the support 42 of the pick-up cam 40, the finger lever 70, which is mounted at the hinge axis 70a coaxial with the hinge axis 80a of the pressure lever 80 and supported by the torsion spring 90, is urged by the finger spring 74. The feeder 60 is spaced apart from the upper surface of the knock-up plate 11.

Figure 7:
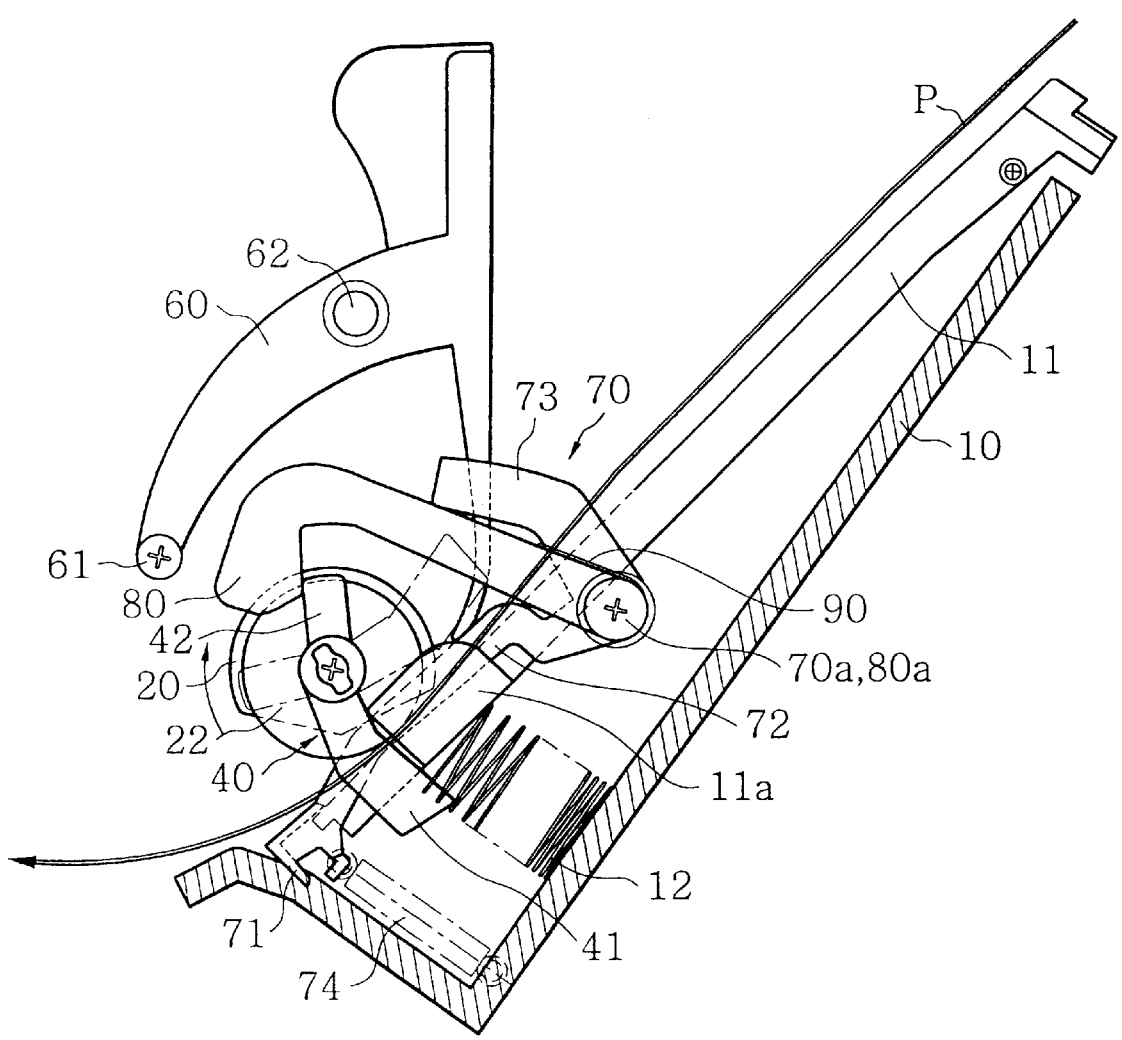
FIG. 7 is a sectional view of the device for feeding the recordable paper to the image forming apparatus according to the present invention, in which the device feeds the recordable paper.
Figure 8:
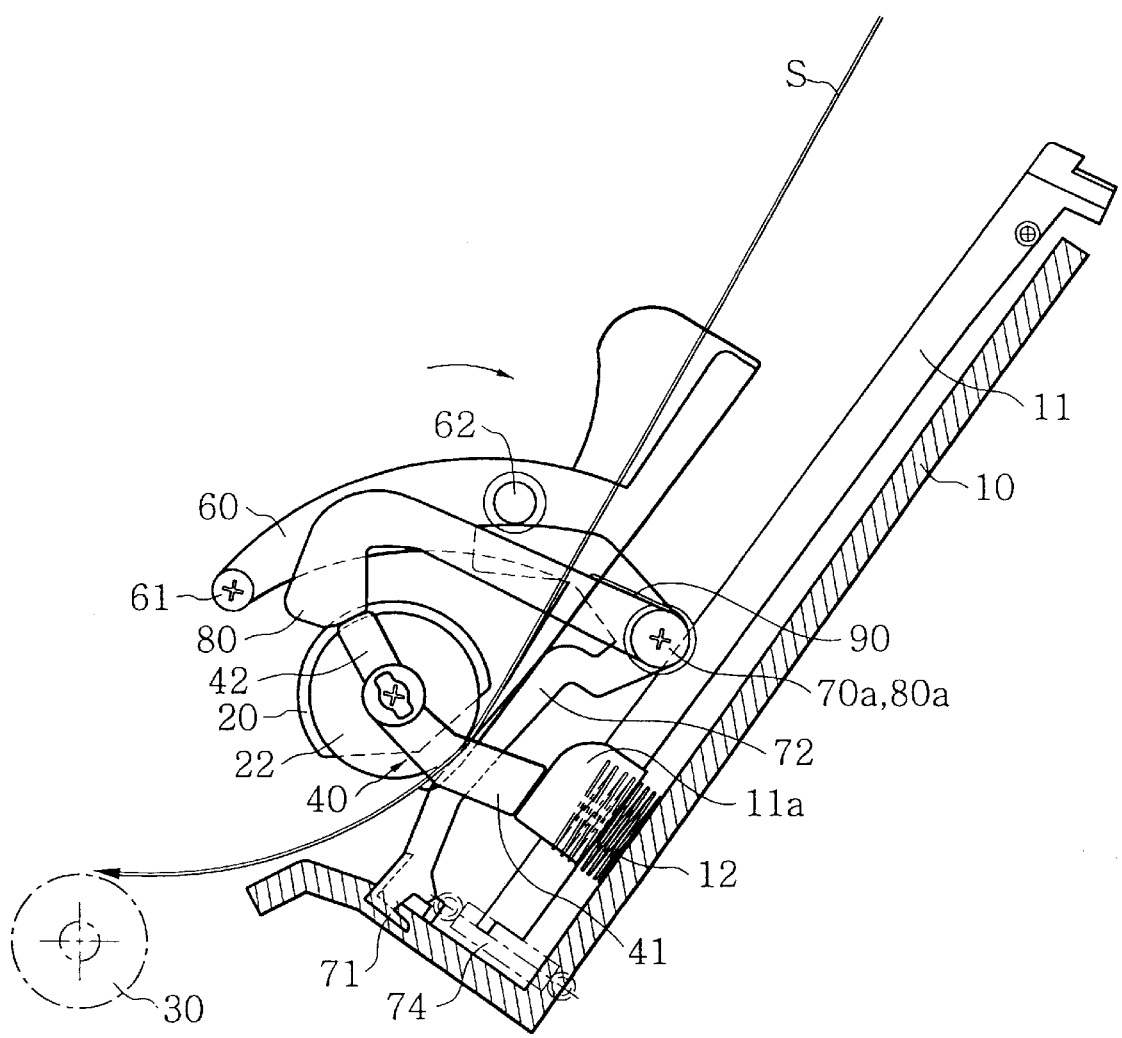
FIG. 8 is a sectional view of the device for feeding the recordable paper to the image forming apparatus according to the present invention, in which the device feeds a document.

In the standby state of the device for feeding the recordable paper, when a signal for automatically operating the feeder is provided for the image forming apparatus, the pick-up roller 20 rotates clockwise and the pick-up cam 40 also rotates with the pick-up roller 20 clockwise, as shown in FIG. 7.

As the pick-up cam 40 rotates, the pressure bar 41 of the pick-up cam 40 is separated from the projection 11a on the knock-up plate 11, so that the pressure lever 80 is rotated counterclockwise by means of a resilient force of the finger spring 74 which is restrained by the pressure lever 80 through the torsion spring 90 and the finger lever 70. The finger lever 70 also is counterclockwise rotated by the torsion spring 90 so that the finger 71 of the arm 72 is moved downward. As the boss 62 for restraining the finger, which is projected from the side of the feeder 60, presses the rotating lever 73 of the finger lever 70 when the feeder 60 is rotated, the finger lever 70 is rotated counterclockwise so that the document to be scanned is provided to the feed roller 30. At that time, the finger lever 70 is rotated counterclockwise so that the document to be scanned passes between the feeder 60 and the pick-up roller 20.

After the document to be scanned is introduced by the feeder 60 to the feed roller 30, the document to be scanned is moved to a scanning position by the rotation of the feed roller 30 when a signal for feeding the document is provided to the image forming apparatus. On the other hand, even though the pressure lever 80 is not mounted on the device for feeding the recordable paper to the image forming apparatus, the same effect as described above can be obtained.

In the device for feeding the recordable paper to the image forming apparatus according to the present invention, as described above, the document to be scanned can be fed by the device to the image forming apparatus along the path of feeding the recordable paper. Accordingly, a structure of the image forming apparatus is simple, resulting in providing a convenience for an user.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A device for feeding a recordable paper to an image forming apparatus, comprising:

a body of the image forming apparatus;

a main frame mounted in a port for feeding the recordable paper, the port being formed on a side wall of the body;

a pick-up roller which is disposed on an upper portion of an inner end of the main frame, for moving the recordable paper to a printing position;

a feeding roller which is mounted in the body spaced from the pick-up roller, for transferring a document to be scanned to a scanning position;

a knock-up plate which is mounted on an upper surface of the main frame, said knock-up plate being resiliently moved by a knock-up spring, for closely contacting the recordable paper with the pick-up roller when the recordable paper is fed from a stack of papers on the knock-up plate;

a feeder for feeding a document, said feeder being pivotably mounted on a hinge axis of the main frame to be disposed over the knock-up plate, a leading edge of the feeder being spaced from the knock-up plate during feeding of the recordable papers and being positioned below the pick-up roller and in contact with the knock-up plate during feeding of the document;

a pick-up cam which is mounted at an end portion on a rotating shaft having the pick-up roller mounted thereon, for spacing the pick-up roller from the knock-up plate before the feeding of the recordable papers and for placing the pick-up roller in close contact with the recordable paper so that the recordable paper is fed as the knock-up plate is forced by the knock-up spring; and a finger lever which is pivotally connected to a side of the main frame and which has a finger for feeding the recordable paper by single sheets.

2. The device for feeding a recordable paper to an image forming apparatus of claim 1, further comprising:

a projection at a side of said knock-up plate to restrain the knock-up plate in a position when the pick-up cam rotates.

3. The device for feeding a recordable paper to an image forming apparatus of claim 1, further comprising:

a pressure lever at an end of said pick-up cam; and a support for preventing a reverse rotation of the finger lever at another end of said pick-up cam.

4. The device for feeding a recordable paper to an image forming apparatus of claim 2, further comprising:

a pressure lever at an end of said pick-up cam; and a support for preventing a reverse rotation of the finger lever at another end of said pick-up cam.

5. The device for feeding a recordable paper to an image forming apparatus of claim 1, further comprising:

a finger restraining boss for restraining the finger lever formed at a side of the document feeder so that the document to be scanned is fed to said feeding roller.

6. The device for feeding a recordable paper to an image forming apparatus of claim 1, further comprising:

an arm on said finger lever, said ann comprising:
a finger at an end or said arm; and
a rotating lever;

said arm and said rotating lever being coaxially pivoted on a hinge shaft formed at the side of the main frame; and an end of said arm being resiliently supported by a finger spring fixed to the main frame.

7. The device for feeding a recordable paper to an image forming apparatus of claim 5, further comprising:

an arm on said finger lever, said arm comprising:
a finger at an end or said arm; and
a rotating lever which is restrained by the finger restraining boss of the document feeder to rotate the finger lever;

said arm and said rotating lever being coaxially pivoted on a hinge shaft formed at the side of the main frame; and an end of said arm being resiliently supported by a finger spring fixed to the main frame.

8. The device for feeding a recordable paper to an image forming apparatus of claim 6, further comprising:

a pressure lever rotatably mounted on the hinge shaft of the finger lever so as to restrain the support of the pick-up cam to hold the knock-up plate under a pressure; and a resilient member mounted on the hinge shaft and resiliently supporting the finger lever and the pressure lever so that the finger lever and the pressure lever are moved together.

9. The device for feeding a recordable paper to an image forming apparatus of claim 7, a further comprising:

a pressure lever rotatably mounted on the hinge shaft of the finger lever so as to restrain the support of the pick-up cam to hold the knock-up plate under a pressure; and a resilient member mounted on the hinge shaft and resiliently supporting the finger lever and the pressure lever so that the finger lever and the pressure lever are moved together.

10. The device for feeding a recordable paper to an image forming apparatus of claim 8, wherein the resilient member is a torsion spring.

11. The device for feeding a recordable paper to an image forming apparatus of claim 9, wherein the resilient member is a torsion spring.

* * * * *